US012683177B2

(12) United States Patent
Rewers et al.

(10) Patent No.: US 12,683,177 B2
(45) Date of Patent: Jul. 14, 2026

(54) FUEL CELL SYSTEM

(71) Applicant: Robert Bosch GmbH, Stuttgart (DE)

(72) Inventors: Gregory Rewers, Schwieberdingen (DE); Alexander Gluschke, Schwieberdingen (DE); Pascal Woerner, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 606 days.

(21) Appl. No.: 18/253,679

(22) PCT Filed: Nov. 5, 2021

(86) PCT No.: PCT/EP2021/080705
§ 371 (c)(1),
(2) Date: May 19, 2023

(87) PCT Pub. No.: WO2022/111972
PCT Pub. Date: Jun. 2, 2022

(65) Prior Publication Data
US 2024/0006639 A1    Jan. 4, 2024

(30) Foreign Application Priority Data
Nov. 25, 2020    (DE) ..................... 10 2020 214 814.7

(51) Int. Cl.
*H01M 8/0662* (2016.01)
*H01M 8/04082* (2016.01)
*H01M 8/04119* (2016.01)

(52) U.S. Cl.
CPC ..... *H01M 8/0687* (2013.01); *H01M 8/04126* (2013.01); *H01M 8/04201* (2013.01); *H01M 2250/20* (2013.01)

(58) Field of Classification Search
CPC ........................ H01M 8/0687; H01M 8/04201
See application file for complete search history.

(56) References Cited

U.S. PATENT DOCUMENTS 6,780,534 B2    8/2004    Stenersen et al.
2002/0150805 A1    10/2002    Stenersen et al.
(Continued)

FOREIGN PATENT DOCUMENTS

CN    107004874 A    8/2017
CN    109638323 A    4/2019
(Continued)

OTHER PUBLICATIONS

Translation of International Search Report for Application No. PCT/EP2021/080705 dated Feb. 8, 2022 (2 pages).

*Primary Examiner* — Christopher P Domone
(74) *Attorney, Agent, or Firm* — Michael Best & Friedrich LLP

(57) ABSTRACT

The invention relates to a fuel cell system comprising:
a fuel cell arrangement having at least one fuel cell and an air inlet,
a feed line connected to the air inlet, a central air filter device which is connected to an inlet of the feed line either directly or via a distributor block, and
a compressor which is located in the feed line and which is designed to suck in ambient air through the central air filter device and to convey said air through the feed line to the air inlet of the fuel cell arrangement. The invention also relates to a decentralized air filter system, which is designed to filter, downstream of the central filter device, air conveyed from the compressor to the air inlet. The decentralized air filter system comprises at least one decentralized air filter device which is located in the feed line between the compressor and the air inlet of the fuel cell arrangement, in the distributor block, or in the central air filter device.

6 Claims, 3 Drawing Sheets

(56)                    References Cited

U.S. PATENT DOCUMENTS

| | | | |
|---|---|---|---|
| 2010/0261079 A1* | 10/2010 | Kells ................... | H01M 8/0491 |
| | | | 429/432 |
| 2014/0087283 A1 | 3/2014 | Stolte et al. | |
| 2015/0147671 A1* | 5/2015 | Matsumoto ............ | B60L 50/72 |
| | | | 429/439 |

FOREIGN PATENT DOCUMENTS

| | | | |
|---|---|---|---|
| DE | 112013002195 | T5 | 1/2015 |
| DE | 102017210588 | A1 | 12/2018 |
| EP | 1469544 | A1 | 10/2004 |
| JP | 2005502988 | A | 1/2005 |
| JP | 2005032653 | A | 2/2005 |
| JP | 2007242396 | A | 9/2007 |
| JP | 2007335286 | A | 12/2007 |
| JP | 2017174565 | A | 9/2017 |

* cited by examiner

FUEL CELL SYSTEM

BACKGROUND

The present invention relates to a fuel cell system, particularly for a vehicle.

Fuel cells are being increasingly used as energy converters, among other things in vehicles, in order to directly convert the chemical energy contained in a fuel, e.g. hydrogen together with oxygen, into electrical energy. Fuel cells typically comprise an anode, a cathode, and an electrolytic membrane located between the anode and the cathode. Oxidation of the fuel occurs at the anode, and a reduction of oxygen occurs at the cathode.

The cathode is typically supplied with ambient air as an oxygen feed by means of a compressor, which is located in a feed line and sucks in ambient air and conveys said air to an air inlet of the fuel cell. Air filter devices located upstream of the compressor are typically employed in order to prevent the entry of particles or undesired chemical elements into the cathode. Due to the arrangement of the compressor or other components downstream of the air filter device, foreign material is again able to enter the previously filtered air. When several fuel cell systems are connected in parallel to a central air filter device, situations may further arise in which air is drawn from one fuel cell system into the other fuel cell system without passing through the central air filter in the manner provided for this purpose.

U.S. Pat. No. 6,780,534 A discloses an inlet air filter for a fuel cell system.

SUMMARY

According to the invention, a fuel cell system is provided.

Advantageous configurations and further developments emerge from the description with reference to the figures.

According to a first aspect of the invention, a fuel cell system comprises a fuel cell arrangement having at least one fuel cell and an air inlet, a feed line connected to the air inlet, a central air filter device which is connected to an inlet of the feed line, a compressor which is located in the feed line and which is designed to suck in ambient air through the central air filter device and convey said air through the feed line to the air inlet of the fuel cell arrangement, and a decentralized air filter device which is located in the feed line between the compressor and the air inlet of the fuel cell arrangement.

One idea underlying this aspect of the invention is to provide a decentralized air filter in a respective feed line, in particular downstream of the compressor, in addition to a central filter device. The advantage achieved as a result is that foreign material that is introduced into the air by the compressor itself is at least partially removed by the decentralized air filter device. Damage to or contamination of the cathode of the fuel cell arrangement, which can be, e.g., a stack comprising a plurality of fuel cells, can be prevented as a result.

A further advantage is that, when several fuel cell assemblies are connected to one another in parallel, e.g. directly or via a distributor block, a decentralized filter device is provided in the feed line connected to the air inlet of the respective fuel cell arrangement. As a result, the air fed to the respective fuel cell arrangement will in any event be filtered at least once in a defined manner, e.g., even if the air is drawn around the central air filter or is drawn through the central air filter in a direction of flow contrary to an intended direction of flow.

According to some embodiments, the fuel cell system can comprise a cooling means located in the feed line between the compressor and the air inlet of the fuel cell arrangement in order to cool the air being conveyed by the compressor, wherein the decentralized air filter device is located between the compressor and the cooling means, or between the cooling means and the air inlet, of the fuel cell arrangement. In the latter case, the advantage achieved is that the air will have already been cooled by the cooling means, thus advantageously reducing the wear on the decentralized filter device.

According to some embodiments, the fuel cell system can comprise a humidifier located in the feed line between the compressor and the air inlet of the fuel cell arrangement in order to humidify the air being conveyed by the compressor, wherein the decentralized air filter device is located between the compressor and the humidifier, or between the humidifier and the air inlet of the fuel cell arrangement.

According to some embodiments, the fuel cell system can comprise the cooling means and the humidifier, wherein the humidifier is located between the cooling means and the air inlet of the fuel cell arrangement, and wherein the decentralized air filter device is located between the cooling means and the humidifier. This arrangement offers the advantage that the air will have already been cooled by the cooling means, but still has a relatively low humidity. This results in particularly efficient filtration of the air and, at the same time, further reducing wear on the filter.

According to a second aspect of the invention, a fuel cell system comprises a plurality of fuel cell assemblies, which each have at least one fuel cell and an air inlet, a central air filter device, and a plurality of feed lines which are respectively connected to the central air filter device and to the air inlet of a fuel cell arrangement, wherein a compressor is located in each feed line, which compressor is designed to suck in ambient air through the central air filter device and to convey said air through the respective feed line to the air inlet of the respective fuel cell arrangement. The fuel cell system further comprises a decentralized filter system designed to filter, downstream of the central filter device, air conveyed from a respective compressor to the respective air inlet.

One idea underlying this aspect of the invention is to provide a fuel cell system having at least two fuel cell assemblies which are connected in parallel with one another to a central air filter device, e.g., directly or via a distributor block, and to provide a decentralized filter system which is designed to filter air which is sucked in by a respective compressor via a flow path which passes around or in a direction opposite the intended direction of flow through a central air filter device. For example, the decentralized filter system can comprise one or more filter units located downstream of a filter unit of the central air filter device.

One advantage of the decentralized air filter system is that the air fed to the respective fuel cell arrangement is always filtered at least once in a defined manner, e.g., even if the air is drawn around the central air filter or is drawn into the central air filter in a direction opposite the intended direction of flow.

According to some embodiments, it can be provided that the central air filter device comprise an inlet, a central filter unit connected to the inlet, and a plurality of outlets, wherein each feed line is connected to an outlet from the central air filter device, wherein the decentralized filter system comprises one or more filter units located in a flow path between the outlets of the central air filter device. For example, the filter arrangement of the central air filter device and the filter assembly or assemblies of the decentralized air filter system can be housed in a common housing. Doing so results in an advantageously compact structure.

According to some embodiments, it can be provided that the central filter unit and the at least one filter unit of the decentralized filter system be integrated into a cartridge. The central filter unit and the filter unit(s) of the decentralized filter system can thus be combined into a single filter unit. For example, the cartridge can comprise a first portion, which is connected to the inlet of the central filter device, and a second portion, wherein the second portion is connected to the outlets from the central filter device. The first portion can be designed to filter air drawn in through the inlet of the central filter device, and the second portion can be designed to filter air drawn in through one of the outlets from the central filter device.

Alternatively, it can be provided that the decentralized filter system comprise several filter units having separate cartridges located in the outlets from the central filter device.

According to some embodiments, it can be provided that the central air filter device have an inlet, an outlet, and a central filter unit connected to the inlet and the outlet wherein the fuel cell system further comprises a distributor block having an inlet connected to the outlet from the central air filter device, and a plurality of outlets, with each feed line being connected to an outlet from the distributor block, and wherein the decentralized filter system comprises one or more filter units which are located in a flow path between the outlets from the distributor block.

According to some embodiments, the decentralized filter system can comprise a filter unit located within an interior space of the distributor block, which filter unit is connected to all outlets of the distributor block, or the filter unit can be located at each outlet from the distributor block.

According to some embodiments, it can be provided that a filter unit of the decentralized air filter system be located in each feed line between the compressor and the air inlet of the respective fuel cell arrangement. The advantage thereby is that foreign material entering compressor can also be removed in an efficient manner. Optionally, the fuel cell system can comprise a cooling means located in the respective feed line between the compressor and the air inlet of the respective fuel cell arrangement in order to cool the air being conveyed by the compressor, wherein the decentralized air filter device is located between the compressor and the cooling means, or between the cooling means and the air inlet of the fuel cell arrangement. Further optionally, the fuel cell system can comprise a humidifier located in the respective feed line between the compressor and the respective air inlet of the fuel cell arrangement in order to humidify the air being conveyed by the compressor, wherein the decentralized air filter device being located between the compressor and the humidifier, or between the humidifier and the air inlet of the fuel cell arrangement. For example, the humidifier can be located between the cooling means and the air inlet of the fuel cell arrangement, wherein the decentralized air filter device is located between the cooling means and the humidifier.

BRIEF DESCRIPTION OF THE DRAWINGS

The invention will be explained in the following with reference to the figures in the drawings. Here.

DETAILED DESCRIPTION

Unless otherwise stated, like reference numbers refer to like or functionally identical components shown in the figures.

"Filtering" is herein understood to generally mean the removal of solid and/or liquid particles (and optionally also the removal of molecular constituents), which can be in a solid, liquid, or gaseous state.

Figure 1:
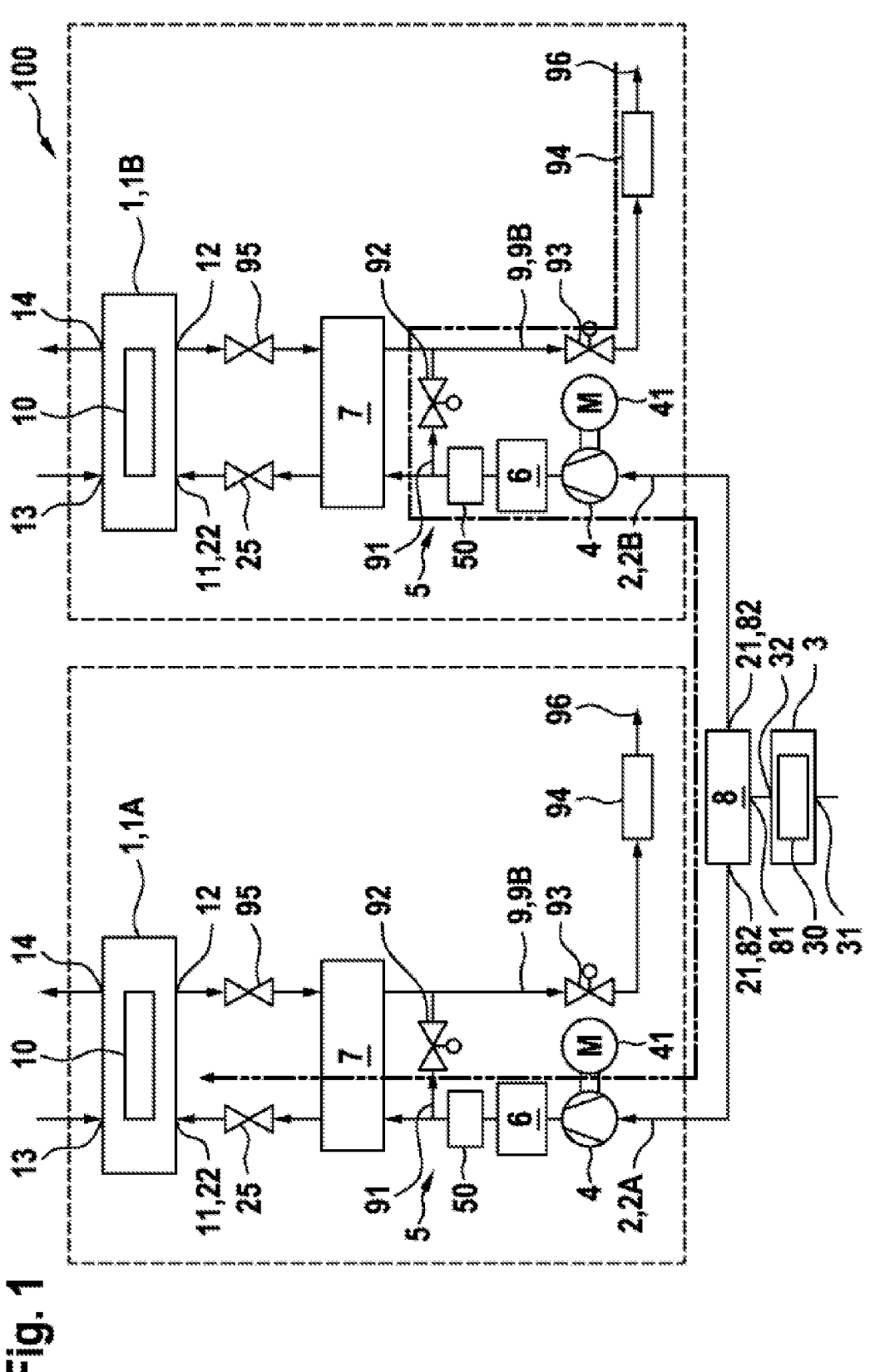
FIG. 1 shows a schematic view of a hydraulic diagram of a fuel cell system according to an embodiment example of the invention.

FIG. 1 illustrates, purely by way of a diagram, a fuel cell system 100 having a first fuel cell arrangement 1A, a second fuel cell arrangement 1, a central air filter device 3, an optional distributor block 8, and a decentralized air filter system 5.

As shown by way of a diagram in FIG. 1, the first and second fuel cell assemblies 1A, 1B can have the same design. Therefore, provided that no differences arise, a fuel cell arrangement 1 is described below in purely general terms. As shown by way of a diagram in FIG. 1, the fuel cell arrangement 1 comprises at least one fuel cell 10, an air inlet 11, an air outlet 12, a fuel inlet 13, and a fuel outlet 14. Preferably, the fuel cell arrangement 1 comprises a fuel cell stack having several fuel cells 10, which can be electrically connected in series. The air inlet 11 and the air outlet 12 are each connected to a cathode side of the fuel cell 10. The fuel inlet 13 and fuel outlet 14 are each connected to a cathode side of fuel cell 10.

The central air filter device 3 (shown only symbolically as a block in FIG. 1) comprises an inlet 31, an outlet 32, and a filter unit 30, e.g., a filter cartridge. The filter unit 30 is fluidically and conductively connected to the inlet 31 and the outlet 32, and said unit is designed to filter air flowing from the inlet 31 to the outlet 32.

The optional distributor block 8 is also shown by way of a diagram in FIG. 1 as a block only and comprises an inlet 81 connected to the outlet 32 from the central filter device 3, as well as several outlets 82. By way of example, FIG. 1 shows a distributor block 8 having two outlets 82.

As shown by way of example in FIG. 1, air inlet 11 of the first fuel cell arrangement 1A can be connected to an outlet 82 from the distributor block 8 via a first feed line 2A. The air inlet 11 of the second fuel cell arrangement 1B can likewise be connected to another outlet 82 from the distributor block 8 via a first feed line 2B. The air inlets 11 of the fuel cell assemblies 1 are thus each connected to the central air filter device 3 by means of a feed line 2 via the distributor block 8. Alternatively, it is conceivable that the central air filter device 3 comprise several outlets 32, wherein each feed line 2A, 2B is connected to an outlet 32 of the central air filter device 3 (e.g., as shown by way of a diagram in FIGS. 2 and 3 and explained in detail hereinafter). In general terms, the central air filter device 3 is thus connected to an inlet 21 of the feed line 2.

As further shown in FIG. 1, a discharge line 9A, 9B opening into the ambient environment can be connected to each air outlet 12 of the respective fuel cell arrangement 1A, 1B.

As can be seen in FIG. 1, the hydraulic components in feed lines 2A, 2B and the discharge lines 9A, 9B in each of the fuel cell assemblies 1A, 1B can be arranged in the same manner. For the sake of clarity, only the layout for a feed line 2 and a discharge line 9 is explained hereinafter.

As shown in FIG. 1, a compressor 4 is located in the feed line 2. For example, the compressor 4 can be powered by an electric motor 41 and be designed to suck in ambient air through the inlet 21 of the feed line 2 and to convey said air to the outlet 22 of the feed line 2 that is connected to the air inlet 11 of the fuel cell arrangement 1.

As further shown in FIG. 1, a cooling means 6 can be located in the feed line 2 between the compressor 4 and the air inlet 11 of the fuel cell arrangement 1 (or the outlet 22 of the feed line 2) in order to cool the air being conveyed by the compressor 4. The cooling means 6 can, for example, be realized as a heat exchanger, using which heat can be removed from the air flowing in the feed line 2.

Alternatively or in addition to the cooling means 6, a humidifier 7 can be located between the compressor 4 and the air inlet 11 of the fuel cell arrangement 1 (or the outlet 22 of the feed line 2) in order to humidify the air being conveyed by the compressor 4 in the feed line 2. As shown by way of example in FIG. 1, the humidifier 7 can in particular be located between the cooling means 6 and the outlet 22 of the feed line 2.

As is also shown in FIG. 1, a first stop valve 25 can optionally be provided in the feed line 2, which valve is located between the compressor 4 and the outlet 22 of the feed line 2. The shutoff valve 25 is preferably located immediately in front of the outlet 22 from the feed line 2, e.g., between the humidifier 7 and the outlet 22, as shown by way of example in FIG. 1.

As further shown by way of example in FIG. 1, an optional second shutoff valve 95 can be provided in the discharge line 9. An optional bypass line 91 connects the feed line 2 to the discharge line 9, wherein the bypass line 91 is connected between the compressor 4 and the first shutoff valve 25, thus upstream of the first shutoff valve 25 to the feed line 2 and downstream of the second shutoff valve 95 to the discharge line 9. The second shutoff valve 95 is thus located between the air outlet 12 of the fuel cell arrangement 1 and a confluence of the bypass line 91. As shown by way of example in FIG. 1, the bypass line 91 can be connected to the feed line 2 between the cooling means 6 and the humidifier 7. A bypass valve 92 is provided in the bypass line 91.

A flow control valve 93 can optionally be provided in the discharge line 9 in order to vary the mass air flow in the discharge line 9. The flow control valve 93 is optionally located downstream of the confluence of bypass line 91 in discharge line 9, as shown by way of example in FIG. 1. Further optionally, a silencer 93 can be provided in the discharge line 9, which silencer is preferably located immediately upstream of an outlet 96 of the discharge line 9 opening into the ambient environment, as shown by way of example in FIG. 1.

The decentralized filter system 5 can comprise at least one decentralized air filter device 50, as shown by way of example in FIG. 1. In the system 100 shown by way of example in FIG. 1, a decentralized air filter device 50 is located in each of the first and second feed lines 2A, 2B downstream of the compressor 4, or between the compressor

4 and the air inlet 11 of the respective fuel cell arrangement 1A, 1B. For example, the decentralized air filter device 50 can be located between the cooling means 6 and the humidifier 7, in particular upstream of the optional bypass line 91, as shown by way of example in FIG. 1. It would also be fundamentally conceivable to arrange the decentralized air filter device 50 between the compressor 4 and the cooling means 6, or between the humidifier 7 and the air inlet 11 of the respective fuel cell arrangement 1A, 1B.

The decentralized air filter device 50 provides the advantage of being able to filter particulate matter and/or substances from the air flow into the air flow through the compressor 4 by virtue of its arrangement downstream of the compressor 4. If the decentralized air filter device 50 is located further downstream (e.g., after the cooling means 6, as shown in FIG. 1), then foreign material introduced into the air flow by the other components can obviously also be removed or filtered.

Another advantage of the decentralized air filter system 5 is that it is designed to filter air being conveyed from a respective compressor 4 to the respective air inlet 1 downstream of the central filter device 3. In the fuel cell system 100 shown by way of example in FIG. 1, when only the first fuel cell arrangement 1A is operating and the second fuel cell arrangement 1B is not operating, the compressor 4 located in the first feed line 2A conveys air to the air inlet 11 of the first fuel cell arrangement 1. The compressor 4 located in the second feed line 2B is switched off. Optionally, the check valves 25, 95 in the second feed line 2B and the second discharge line 9B can be closed, and the bypass valve 92 and any control valve 93 provided in the second discharge line 9B can be open. The compressor 4 located in the first feed line 2A can thus suck in ambient air through the second discharge line 9B, as symbolically shown by the dotted line L in FIG. 1. This outside air flow L flows through the distributor block 8 and does not pass through the central air filter device 3. However, the outside air flow L is still filtered through the decentralized air filter device 50 before said air reaches the cathode side of the fuel cell 10 of the first fuel cell arrangement 1A via the air inlet 11.

The fuel cell system 100 shown by way of example in FIG. 1 comprises, by way of example only, first and second fuel cell arrangement 1A, 1B. In principle, the system 100 can also be realized using only one fuel cell arrangement 1. It is also conceivable that more than two fuel cell arrangements 1 be provided.

If the fuel cell system 100 comprises more than one fuel cell arrangement 1, e.g., a first and a second fuel cell arrangement 1A, 1, as shown by way of example in FIG. 1, then the central air filter device 3 can comprise an inlet 31, an outlet 32, and a central filter unit 30 connected to the inlet 31 and the outlet 32, wherein the fuel cell system 100 further comprises a distributor block 8 having an inlet 81 connected to the outlet 32 of the central air filter device 3 and a plurality of outlets 82, with each feed line 2A, 2B being connected to a respective outlet 82 from the distributor block 8. This configuration is shown by way of example in FIG. 1. It is further shown in FIG. 1 that a filter arrangement 50 or filter device 50 of the of the decentralized air filter system 5 is located in each feed line 2A, 2B between the compressor 4 and the air inlet 11 of the respective fuel cell arrangement 1A, 1B.

Figure 4:
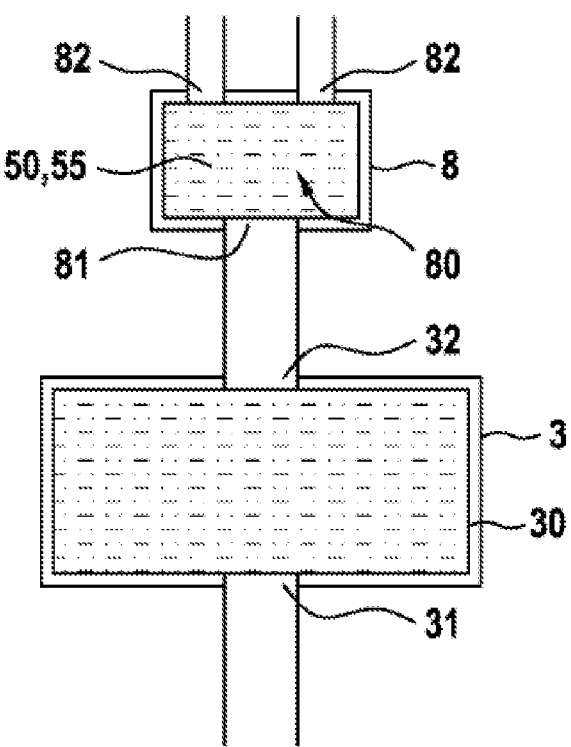
FIG. 4 shows a schematic cross-sectional view of a central air filter device and a distributor block of a fuel cell system according to an embodiment example of the invention.

Alternatively or additionally, the decentralized filter system 5 can comprise a filter unit 50 located within an interior space 80 of the distributor block 8, which filter unit is connected to all outlets 82 from the distributor block 8, as shown by way of a diagram in FIG. 4. For example, a filter cartridge 55 can be received in the interior space 80 of the distributor block 8, which cartridge is fluidically and conductively connected to the outlets 82, and preferably also to the inlet 81 of the distributor block 8. The filter cartridge 55 can be designed to filter air entering one of the outlets 82 to the internal space 80 and exiting the latter at a different outlet 82. The filter unit 50 is thus located in a flow path between the outlets 82 of the distributor block 8 and is designed to filter air conveyed from a respective compressor 4 to the respective air inlet 11 downstream of the central filter device 3.

Figure 5:
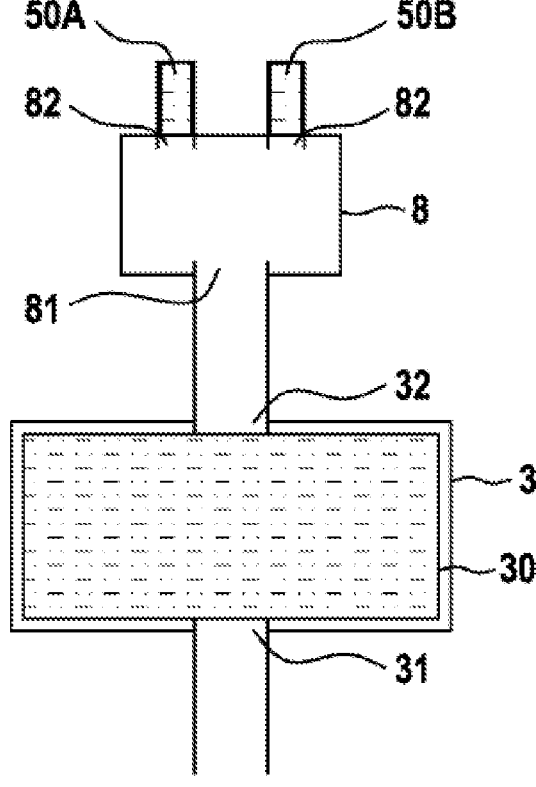
FIG. 5 shows a schematic cross-sectional view of a central air filter device and a distributor block of a fuel cell system according to a further embodiment example of the invention.

As an alternative to the design of the distributor block 8 shown in FIG. 4, a separate filter unit 50A, 50B can also be located in each outlet 82 of the distributor block 8, as shown by way of a diagram in FIG. 5. For example, the filter units 50A, 50B can each be individual cartridges 55.

As can be seen in FIGS. 4 and 5, the decentralized filter system 5 can thus generally comprise one or more filter units 50, 50A, 50B, which are located in a flow path between the outlets 82 from the distributor block 8.

As already explained, it is also conceivable that the distributor block 8 be omitted. In this case, the central air filter device 3 comprises an inlet 31, a central filter unit 30 connected to the inlet 31, and a plurality of outlets 32, wherein each feed line 2A, 2B is connected to an outlet 32 from the central air filter device 3, as shown by way of diagrams in FIGS. 2 and 3, respectively. Also in this case, the decentralized filter system 5 can comprise decentralized filter units 50, wherein a filter unit 50 of the decentralized air filter system 5 is located in each feed line 2A, 2B between the compressor 4 and the air inlet 11 of the respective fuel cell arrangement 1A, 1, as shown by way of a diagram in FIG. 1. Alternatively or additionally, the decentralized filter system 5 can comprise one or more filter units 50A, 50B located in a flow path between the outlets 32 of the central air filter device 3, as shown by way of example and purely by way of diagrams in FIGS. 2 and 3.

Figure 2:
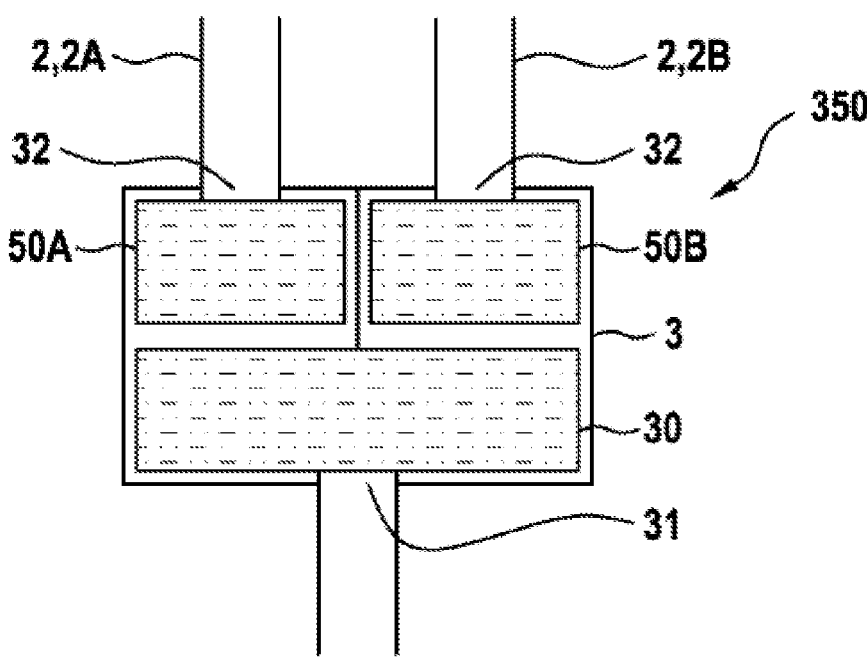
FIG. 2 shows a schematic cross-sectional view of a central air filter device of a fuel cell system according to an embodiment example of the invention.

It is shown by way of example in FIG. 2 that the central filter device 30 of the central filter device 3 and the filter units 50A, 50B of the decentralized filter system 5 can be integrated into a common cartridge 350. For example, the cartridge 350 can comprise a central filter unit 30, which is connected to the inlet 31, and a decentralized filter unit 50A, 50B at each outlet 32, which decentralized filter unit is connected to the respective outlet 32. The decentralized filter units 50A, 50B are thus located in a flow path between the outlets 32 from the central air filter device 3.

Figure 3:
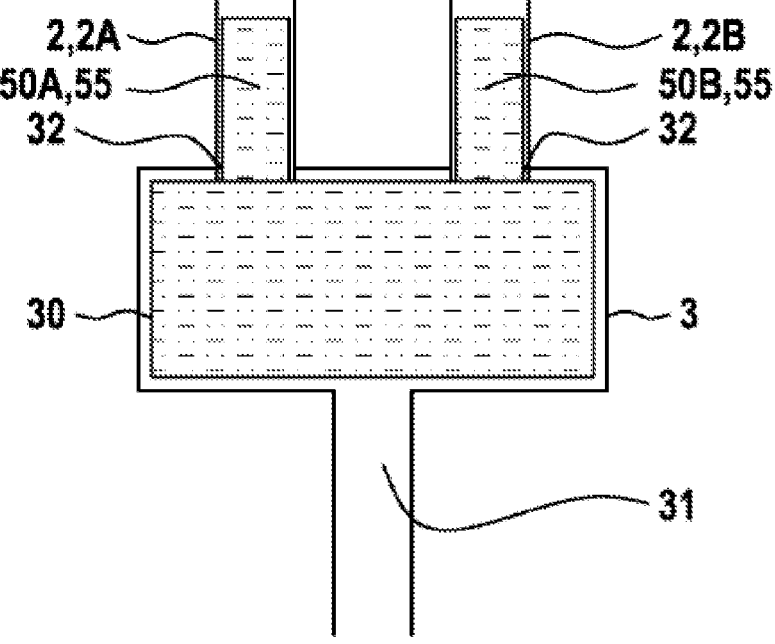
FIG. 3 shows a schematic cross-sectional view of a central air filter device of a fuel cell system according to a further embodiment example of the invention.

As an alternative to the design of the central filter device 3 shown in FIG. 2, it is also conceivable that the decentralized filter system 5 comprise several filter units 50A, 50B having separate cartridges 55 located in the outlets 32 of the central filter device 3, as shown schematically and by way of example in FIG. 3. In this case, the decentralized filter units 50A, 50B are again located in a flow path between the outlets 32 of the central air filter device 3.

Although the present invention has been explained above with reference to embodiment examples, the invention is not limited thereto and can instead be modified in a variety of ways. Combinations of the above embodiment examples are in particular also conceivable.

What is claimed is:

1. A fuel cell system (100) comprising:
   a plurality of fuel cell arrangements (1A, 1B), each comprising at least one fuel cell (10) and an air inlet (11);
   a central air filter device (3);
   a plurality of feed lines (2A, 2B), each connected to the central air filter device (3) and to the air inlet (11) of a respective fuel cell arrangement (1A, 1B), wherein a compressor (4) is located in each feed line (2A, 2B), which compressor is designed to suck in ambient air through the central air filter device (3) and convey said air through the respective feed line (2A, 2B) to the air inlet (11) of the respective fuel cell arrangement (1A, 1B); and
   a decentralized filter system (5) which is designed to filter, downstream of the central filter device (3), air conveyed from a respective compressor (4) to the respective air inlet (11).

2. The fuel cell system (100) according to claim 1, wherein the central air filter device (3) comprises an inlet (31), a central filter unit (30) connected to the inlet (31), and a plurality of outlets (32), wherein each feed line (2A, 2B) is connected to an outlet (32) from the central air filter device (3), wherein the decentralized filter system (5) comprises one or more filter units (50A, 50B) which are located in a flow path between the outlets (32) from the central air filter device (3).

3. The fuel cell system (100) according to claim 2, wherein the central filter unit (30) and the at least one filter unit (50, 50A, 50B) of the decentralized filter system (5) are integrated into a cartridge (350), or wherein the decentralized filter system (5) comprises several filter units (50A, 50B), which have separate cartridges (55) and are located in the outlets (32) from the central filter device (3).

4. The fuel cell system (100) according to claim 1, wherein the central air filter device (3) comprises an inlet (31), an outlet (32) and a central filter unit (30) connected to the inlet (31) and the outlet (32), wherein the fuel cell system (100) further comprises a distributor block (8) having an inlet (81) connected to the outlet (32) of the central air filter device (3) and a plurality of outlets (82), wherein each feed line (2A, 2B) is connected to an outlet (82) from the respective distributor block (8), and wherein the decentralized filter system (5) comprises one or more filter units (50, 50A, 50B), which are located in a flow path between the outlets (82) from the distributor block (8).

5. The fuel cell system (100) according to claim 4, wherein the decentralized filter system (5) comprises a filter unit (50) located within an interior space (80) of the distributor block (8), which filter unit is connected to all outlets (82) from the distributor block (8), or wherein a filter unit (50A, 50B) is located at each outlet (82) from the distributor block (8).

6. The fuel cell system (100) according to claim 1, wherein a filter unit (50) of the decentralized air filter system (5) is located in each feed line (2A, 2B) between the compressor (4) and the air inlet (11) of the respective fuel cell arrangement (1).

\* \* \* \* \*